(12) United States Patent
Lippert et al.

(10) Patent No.: US 10,612,685 B2
(45) Date of Patent: Apr. 7, 2020

(54) CONNECTION ADAPTER AS A TEST PORT, INCLUDING SHUTOFF DEVICE

(71) Applicant: WIKA Alexander Wiegand SE & Co. KG, Klingenberg (DE)

(72) Inventors: Carmen Lippert, Aschaffenburg (DE); Alexander Hein, Grosswallstadt (DE); Arthur Boettcher, Oldenburg (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 0 days.

(21) Appl. No.: 16/028,762

(22) Filed: Jul. 6, 2018

(65) Prior Publication Data
US 2019/0011059 A1 Jan. 10, 2019

(30) Foreign Application Priority Data
Jul. 10, 2017 (DE) .................. 10 2017 006 477

(51) Int. Cl.
*F16K 31/50* (2006.01)
*F16K 41/10* (2006.01)
(Continued)

(52) U.S. Cl.
CPC ............ *F16K 31/50* (2013.01); *F16K 41/103* (2013.01); *G01L 7/043* (2013.01); *G01L 9/0041* (2013.01);
(Continued)

(58) Field of Classification Search
CPC ....... F16K 31/50; F16K 41/103; G01L 7/043; G01L 9/0041; Y10T 137/6109
See application file for complete search history.

(56) References Cited

U.S. PATENT DOCUMENTS 5,836,351 A * 11/1998 Underwood, III .... F16K 17/196
137/587
6,227,908 B1 * 5/2001 Aumeier ............ H01R 13/6593
439/186
(Continued)

FOREIGN PATENT DOCUMENTS

CN 204852361 U 12/2015
CN 205680617 U 11/2016
(Continued)

*Primary Examiner* — Eric Keasel
*Assistant Examiner* — Kevin R Barss
(74) *Attorney, Agent, or Firm* — Muncy, Geissler, Olds & Lowe, P.C.

(57) ABSTRACT

A connection adapter for connecting a process chamber to a measuring system, in particular to a pressure, density or temperature measuring system, which includes at least three ports, having a process port, the process port being connected or connectable to the process chamber, a measuring port, the measuring system being connected or connectable to the measuring port, and an access port, which includes a self-sealing coupling. The connection adapter, furthermore includes a line system, having lines and at least one closable shutoff device. The line system connecting the process port to the measuring port and the access port, the connection between the process port and the measuring port being blockable gas-tight with the aid of the shutoff device, and the access port being connected or connectable to the measuring port via the line system. A measuring apparatus having a connection adapter is also provided.

19 Claims, 11 Drawing Sheets

(51) Int. Cl.
  *G01L 7/04*   (2006.01)
  *G01L 9/00*   (2006.01)
  *G01L 9/08*   (2006.01)
  *G01N 9/26*   (2006.01)
  *G01L 19/00*  (2006.01)
  *G01N 9/00*   (2006.01)

(52) U.S. Cl.
  CPC ............ *G01L 9/08* (2013.01); *G01L 19/0007* (2013.01); *G01N 9/26* (2013.01); *G01N 9/00* (2013.01)

(56) References Cited

U.S. PATENT DOCUMENTS

| | | |
|---|---|---|
| 7,013,916 B1 * | 3/2006 | Pearlstein ........... F16K 37/0091 |
| | | 137/613 |
| 7,755,362 B2 | 7/2010 | Stelter |
| 9,766,145 B2 * | 9/2017 | Deane ................. G01L 19/0046 |
| 9,916,949 B2 | 3/2018 | Stelter et al. |
| 2011/0030480 A1 * | 2/2011 | Newman ................ G01L 7/041 |
| | | 73/741 |

FOREIGN PATENT DOCUMENTS

| | | |
|---|---|---|
| DE | 100 36 071 A1 | 2/2002 |
| DE | 10 2007 016 720 A1 | 10/2008 |
| DE | 202014102319 * | 1/2014 |
| DE | 10 2014 201 576 | 7/2015 |

\* cited by examiner

CONNECTION ADAPTER AS A TEST PORT, INCLUDING SHUTOFF DEVICE

This nonprovisional application claims priority under 35 U.S.C. § 119(a) to German Patent Application No. 10 2017 006 477.6, which was filed in Germany on Jul. 10, 2017, and which is herein incorporated by reference.

BACKGROUND OF THE INVENTION

Field of the Invention

The present invention relates to a connection adapter as a test port, including a shutoff device for a pressure, density or temperature measurement system. The invention furthermore relates to a measuring apparatus, comprising a connection adapter of this type.

Description of the Background Art

In medium- and high-voltage systems, to avoid voltage flashovers and discharges, gas-insulated switchgear (GIS for short) with high-voltage circuit-breakers and gas-insulated transmission lines (GIL for short) are operated as completely encapsulated machines at operating voltages from 6 kV to 800 kV in an insulating atmosphere containing sulfur hexafluoride ($SF_6$). For this purpose, the $SF_6$ is contained in a process chamber, in which the switchgear or the transmission lines are operated or which forms the transmission line. Compared to outdoor switchgear, this saves a great deal of space and minimizes the influences of weather. $SF_6$ is used as an extinguishing gas to interrupt arcs in circuit-breakers.

In switchgear with the in principle nontoxic $SF_6$ gas, not only does nontoxic tetrafluoromethane arise during the course of operation but also toxic fluoride compounds, such as hydrogen fluoride and thionyl fluoride as well as the highly toxic disulfur decafluoride ($S_2F_{10}$), due to the arcs combined with contaminants, such as a low water proportion. For these reasons, corresponding safety guidelines relating to ventilation must be observed in gas-tight $SF_6$ switchgear prior to any maintenance work. According to the "Fourth Assessment Report of the IPCC (Intergovernmental Panel on Climate Change)," $SF_6$ is the most powerful greenhouse gas known. For these reasons, care must be taken to ensure that the $SF_6$ gas does not escape from the process chamber.

At the same time, it is important for the function of the components operated in the $SF_6$ gas that an adequate quantity and density of $SF_6$ gas is present. In addition to the density and pressure of the $SF_6$ gas, it may also be of interest to monitor the temperature of the $SF_6$ gas to be able to draw conclusions as to a possible change in the $SF_6$ atmosphere in the process chamber. Measuring systems are used for this purpose, which make it possible, for example, to monitor the pressure of the $SF_6$ gas in the process chamber.

A function of the sensors used must be regularly tested to avoid errors in monitoring the pressure. For this purpose, suitable blockable connection adapters are used, such as the connection adapters known from DE 10 2014 201 576 A1 (which corresponds to U.S. Pat. No. 9,916,949), DE 100 36 071 A1, DE 10 2007 016 720 A1 (which corresponds to U.S. Pat. No. 7,755,362), CN 205 680 617 U and CN 204 852 361 U.

SUMMARY OF THE INVENTION

It is therefore an object of the present invention to provide a connection adapter which is improved over the prior art and an improved measuring apparatus.

The connection adapter according to an exemplary embodiment of the invention for connecting a process chamber to a measuring system, in particular to a pressure, density or temperature measuring system, can include at least three ports. These ports comprise a process port, the process port being connected or connectable to the process chamber, a measuring port, the measuring system being connected or connectable to the measuring port, and an access port, which includes a self-sealing coupling. A line system furthermore comprises lines and at least one connectable shutoff device, the line system connecting the process port to the measuring port and the access port, and the connection between the process port and the measuring port being blockable gas-tight with the aid of the shutoff device. The access port is furthermore connected or connectable to the measuring port via the line system.

A process chamber in the present case can be understood to be a chamber filled with gas. For example, a component may be operated in the process chamber, the component being, for example, a medium- or high-voltage circuit-breaker or a transmission line. For example, an insulating gas, in particular an $SF_6$ gas, is contained in the process chamber for reducing an electrical conductivity or for reducing electrical sparkovers during switching processes or during operation.

A gas-tight closure can be understood to be a closure which is gas-tight with respect to the gases used. The gas-tight closure is gas-tight, in particular, with respect to molecular gases, in particular with respect to $SF_6$. A seal with respect to atomic gases, such as noble gases and, in particular with respect to helium, thus does not need to be present to implement a gas-tight closure within the meaning of the present invention.

After closing the connection to the process port with the aid of the shutoff device, the connection adapter enables the testing of a measuring system connected to the measuring port using a test unit connected to the access port without having to establish a new connection to the measuring system. The fact that the valve remains closed after testing the pressure measuring device may furthermore be avoided if a maintenance technician does not reopen the valve, and another measurement of the $SF_6$ gas in the process chamber is thus not carried out. Compared to approaches, in which a sealing takes place at a point of intersection, the fact that both accesses are always closed at the same time is avoided. A high sealing effect of the valve may also be implemented more easily and at a high level of quality compared to approaches of this type.

In known approaches, in which openings arranged perpendicularly to the movement of a sealing piston are closed due to a linear movement of the sealing piston, these openings may not be sealed pressure-tight and not gas-tight with minimal clearance. When the valve opens and closes, the test gas may mix with the $SF_6$ gas in the area of the valve and thereby reduce the period in which the process chamber may be used. If the valve is in a suitable position, it is furthermore possible to short-circuit the test unit with the process chamber. This is effectively avoided with the aid of the connection adapter.

With the aid of the connection adapter, a cost-effective and reliable approach for an access port having a shutoff device for a pressure, density or temperature measuring system may be created, which is connected or connectable to a process chamber. It is moreover made possible with the aid of the connection adapter to implement a measuring apparatus, which is particularly tight and easy to operate. Operator errors by technicians who test a measuring system are ruled out hereby, or at least a risk of such errors occurring is significantly reduced.

It may be provided that the measuring port and the access port are gas-permeably connected or connectable to each other via a line of the connection adapter, at least when the line system is blocked gas-tight from the process port with the aid of the shutoff device. It may namely be sufficient for the gas-permeable connection between the measuring port and the access port to be established only when the line system is blocked gas-tight. At least, however, a gas-permeable connection of this type must be possible to test a measuring system which is connected to the measuring port. A variant of this type may be advantageous so that an influence of the testing of the measuring unit at the measuring port via a measuring chamber connected to the process port may be ruled out.

It may furthermore be provided that the shutoff device or a valve of the shutoff device is disposed in a line or between two lines of the line system.

It may furthermore be provided that a port for a measuring sensor, in particular for a pressure, density or temperature measuring system, is formed as a single piece on the measuring port of the connection adapter, for example in the form of a flange. This ensures that no leaks occur between the measuring port and the rest of the connection adapter, or that no additional components are needed to seal the measuring port against the rest of the connection adapter. The measuring sensor may also be easily and comfortably connected to the connection adapter.

In the connection adapter, it may furthermore be provided that the line system has multiple parts, for example a first line part of the line system, which connects the process port to the shutoff device, opens into the shutoff device at an angle between 85° and 5°. This ensures that the shutoff device may be situated in the connection adapter at right angles to the measuring port, the process port and the access port. As a result, the connection adapter may be structured or formed in the manner of a T-piece having a mounted shutoff device.

It may furthermore be provided that the shutoff device comprises a sealing seat and a closure part, a first line part of the line system, which connects the process port to the shutoff device, opens into the shutoff device between the sealing seat and the closure part when the shutoff device is opened, and a second line part of the line system, which connects the shutoff device with the measuring port, is connected to an opening in the sealing seat of the shutoff device for connection to the shutoff device. A reliable, gas-tight closing of the line system may be ensured hereby in a structurally simple manner.

It may be provided that the sealing seat is disposed opposite the test port. The design of the connection adapter as a T piece having a mounted shutoff device may be implemented hereby.

Moreover, it may be provided that the sealing seat of the shutoff device is made from a nonferrous metal or a nonferrous metal alloy, in particular brass, for example, the closure part being made from a harder metal than the sealing seat, in particular from high-grade steel. A good sealing action of a shutoff device may be achieved hereby.

It may also be provided that the closure part is a sealing cone, movable against the sealing seat, which is axially movable against the sealing seat in a sealing manner over a threaded section, for example via a screw, e.g. via a square-head screw. A self-sealing sealing of the sealing cone against the sealing seat may be generated hereby, with the aid if which a high sealing against molecular gases is possible.

It may be provided that the sealing cone of the shutoff device has a cone angle of at least 25° and a maximum of 75°, for example at least 40° and a maximum of 60°, and/or the sealing seat has a diameter of at least 1 mm and a maximum of 5 mm, for example a diameter of at least 1 mm and a maximum of 3 mm. On the one hand, a high sealing action of the shutoff device is achieved hereby, and on the other hand, an adequately high free line cross-section is provided when the shutoff device is open, so that an adequate gas exchange between the process chamber and the measuring system is possible for the purpose of determining at least the pressure or the density of the gas from the process chamber. An adequate gas exchange of this type may also be used to determine the temperature of the gas from the process chamber.

To better seal the shutoff device, it may be provided that the movable closure part, in particular the movable sealing cone, of the shutoff device is connected, sealed to the outside, to a valve body of the shutoff device via a bellows, for example via a metal bellows, the valve body being rigidly connected to the sealing seat. A high tightness of the shutoff device is achieved hereby. An escape of a process gas at the shutoff device may be prevented hereby.

It may be provided that the movable closure part is connected to the sealing element via the bellows, the sealing element being sealed to the valve body with an O ring, and/or the sealing element being metallically sealed against the valve body via a sealing groove. An even stronger sealing of the shutoff device is achieved hereby.

The connection adapter can include a one-piece base body, in which the line system and the access port, for example, a test line, are formed, the base body being made from steel, high-grade steel, aluminum or a metallic alloy. The base body forms, in particular, the base for the connection adapter. The base body therefore forms the most voluminous part of the connection adapter. The base body makes up, for example, at least 50% or 50 vol % of the entire connection adapter. The connection adapter is tight and robust, due to the use of a base body made from steel, high-grade steel, aluminum or a metallic alloy. As a result, a wear or damage to the connection adapter is prevented during use, through which the connection adapter would become functionally impaired, in particular would be permeable to the gas from the process chamber. The one-piece design of the base body facilitates a compact structure of the connection adapter and an easy handling thereof. Due to its one-piece design and a resulting lack of joints resulting therefrom, the base body is furthermore characterized by a particularly good tightness, a great robustness and a long service life. A number of possible leak sources is thus significantly reduced in the connection adapter, so that a risk of leaks during the mounting and removal of the connection adapter is very slight.

The measuring system can be connected or welded directly to the one-piece base body. The risk of leaks is again minimized hereby, resulting in a particularly good tightness, great robustness and a long service life.

The connection between the access port and the measuring port as well as the connection between the measuring port and the process port can be implemented in areas by a shared line. This shared line is, for example, a line part which leads to the measuring port and which is connected to the other line parts via an intersection, another line part leading from the intersection to the shutoff device, on the one hand, and another line part leading to the access port, on the other hand, the line parts being formed, for example, within the base body.

The shutoff device can be operable using a tool, and the connection adapter has a securing device, which prevents a detachment of the tool from the shutoff device when the shutoff device is closed, for example when the shutoff device is not open all the way. This may achieve the fact that, after completely activities for which a previous closing of the shutoff device is required, the user does not inadvertently leave the shutoff device closed, whereby the measurement of the gas in the process room with the aid of the measuring system is ensured when the operation of the equipment with the process chamber is resumed. Since the tool is detachable only if the shutoff device is not closed, and a technician entrusted with activities which require a temporary closing of the shutoff device packs up his tool and takes it with him during the normal course of his work will be forced to open the shutoff device again. Activities which require a previous closing of the shutoff device may include, for example, the use of a test unit for testing a measuring system connected to the measuring port.

It may be provided that the securing device includes a housing part and a limiting disk which is rotatably supported with respect to the housing part. A structurally simple securing device may be implemented hereby.

The tool can be a key, the limiting disk allowing the key, including a coding cam of the key, to be introduced through a central opening in an open, in particular completely open, position of the shutoff device, the coding cam being insertable into a recess of the limiting disk, or a circumferential wall preventing the key from being removed during rotation. The securing device may be cost-effectively and reliably implemented, due to this simple design.

At least one bow-shaped elongated grove can be disposed in the limiting disk for rotating the limiting disk against the housing part, a contact surface being disposed on the at least one bow-shaped elongated groove, via which the limiting disk is fixed or fixable with respect to the housing part with the aid of at least one projection, in particular using at least one screw. This achieves the fact that the projections are movable within the elongated grooves to align the limiting disk relative to the housing part in such a way that, after fixing the limiting disk, the tool is detachable from the securing device only when the shutoff device is opened, in particular opened all the way.

The shutoff device can have an axis of symmetry which runs through a sealing seat and the closure part, the axis of symmetry running at least essentially in parallel to a line to the access port. This embodiment permits a particular compact design of the base body and thus of the connection adapter.

The axis of symmetry of the shutoff device can at least essentially run at a same height as or at least nearly congruently or in a plane with an axis of symmetry of the line to the access port. This embodiment also permits a particularly compact design of the base body and thus of the connection adapter and a particularly easy manufacture thereof, since the lines for the shutoff device and the access port may be particularly easily produced with the aid of a shared bore in a single operation, for example when the shutoff device and the access port are opposite each other.

The axis of symmetry of the shutoff device can run at least essentially at the same height as the axis of symmetry of the line to the access port, the line of the axis port and the line of the shutoff device, however, not being opposite each other but rather, for example, running at an angle of 90° to each other. Any other angle is also possible. An angled design of this type facilitates an improved accessibility of the shutoff device and/or the access connection, depending on a specific application.

The line system can comprise multiple line parts and a space between a sealing seat and a closure part of the shutoff device, for example a first line part connecting the process port to the space of the shutoff device, and a second line part, in particular a multi-part second line part, connecting the measuring port to the space of the shutoff device. As a result, the line system may be easily designed so that the line system is blockable with the aid of the shutoff device. The space is then part of the shutoff device and simultaneously also forms part of the line system. This arrangement is a variant which is structurally particularly easy to implement.

The line system can be blockable gas-tight by means of the shutoff device with less than one full rotation, for example with a three-quarter rotation, or reversibly from the completely open state by means of a linear displacement. This achieves the fact that the shutoff device may be quickly and easily operated. In addition, a securing device for a shutoff device of this type may be easily and cost-effectively constructed.

The measuring system can comprise at least one of the components selected from pressure sensors, temperature sensors and evaluation circuits which operate electronically and/or electrically. These sensors are particularly suitable for a test of whether an adequate quantity of a process gas is available in the process chamber.

A dead leg can be provided in the connection adapter between the process port and a connection to the line parts which are connected to the access port and/or the measuring port, the dead leg being closed by a closure, in particular by a plug. The lines in the connection adapter may be provided hereby in the manner of a cross without the shutoff device having to engage at the point of intersection. For this purpose, it is provided, for example, that part of the line system branches off of the dead leg, or the dead leg branches off of the line system and opens into the shutoff device at an angle of less than 90°.

The shutoff device can be part of a two-way valve system which, in a first position, connects the measuring port to the access port via the line system and closes the process port with respect to the measuring port and the access port and, in a second position, connects the measuring port to the process port via the line system and closes the access port with respect to the measuring port and the process port. This makes it possible to ensure that the process chamber is unable to be inadvertently connected to the access port and, for example, to a test unit connected thereto. In addition, the access port may be reliably sealed in this manner. For this purpose, it may also be provided that, in a third position between the first and second positions, the shutoff device closes the connection between the measuring port and the access port, the connection between the measuring port and the access port and the connection between the access port and the process port. A "short-circuit" of the connections is preventable hereby.

The access port can be closed or closable with a sealing plug. An additional sealing of the access port is achievable hereby to prevent the gas from exiting the process chamber.

The line system can comprise at least one channel bore, in particular multiple channel bores, which are formed in the connection adapter. A cost-effective design of the connection adapter is achieved hereby.

The shutoff device can include a manually operable control element, in particular a stop valve, with which the shutoff device is to be opened and closed from the outside. This makes the connection adapter particularly easy to operate from the outside.

The process chamber can be connected or connectable gas-tight and pressure-tight to the measuring system via the connection adapter, the process port is connected or connectable gas-tight and pressure-tight to the process chamber, the measuring port is connected or connectable gas-tight and pressure-tight to the measuring system, and the access port is connected or connectable gas-tight and pressure-tight, for example to a test unit, via the self-sealing coupling. This achieves the fact that a connection which is gas-tight and pressure-tight to the outside is possible via the connection adapter, which reliably prevents the gas from exiting the process chamber. It is sufficient, for example, if the connections are pressure-tight up to a pressure of two atmospheres. The connections should also be tight with an underpressure, so that no molecular gases penetrate the connection adapter from the outside in an underpressure of one tenth of an atmosphere. However, they do not have to be vacuum-tight.

The measuring apparatus according to the invention comprises a connection adapter described above. A measuring apparatus of this type has the advantageous characteristics of the connection adapter.

The measuring system, in particular a pressure, density or temperature measuring system, can be connectable or directly connected to the measuring port.

Adjustable, electrical or electronic trip contacts can be provided on the measuring system, which trip upon reaching a limiting value, in particular upon reaching a limit pressure, a limit density or a limit temperature. The trip contacts are individually electrically connected to separate individual contacts accessible from outside the measuring system, the individual contacts being, for example, part of a shared plug connection, and the electrical connections between the trip contacts and the individual contacts being brought out of a housing of the measuring system in the area of the plug connection. As a result, the measuring apparatus may be used to electronically evaluate measured data of the measuring system and to electrically switch warning messages, displays or automated orders.

The measuring system coupled pressure-tight can measure the density of a gas in the connection adapter via a temperature-compensated bourdon tube system and outputs it via a motion works and pointer on a dial. A calibratable measuring apparatus is created hereby for determining the density of a gas from the process chamber, which is harmful or hazardous for the environment or the surroundings.

The measuring device can surround the process chamber, and a gas which is hazardous or undesirable for the environment is contained in the process chamber, the process chamber being secured by means of at least one additional structural measure to prevent the escape of the gas, the gas being, for example, $SF_6$ gas. As a result, the measuring apparatus, together with the process chamber, may be used as a component for medium- and high-voltage systems, for example for gas-insulated switchgear (GIS for short) having high-voltage circuit-breakers and for gas-insulated transmission lines (GIL for short) as completely encapsulated machines with operating voltages between 6 kV and 800 kV.

A seal on a flange of the process chamber or a seal of the walls of the process chamber or a seal of a passage for an electrical conductor (a medium- or high-voltage cable) can be provided. The process chamber is structurally secured hereby against an escape of the gas even outside the connection adapter.

A) In a method for measuring a pressure, a density and/or a temperature of a gas in a process chamber, including a measuring system, and for testing the measuring system using a connection adapter connected to the process chamber or a measuring apparatus connected to the process chamber, the following steps can take place consecutively: A) the process chamber is connected to the measuring system via a line system of the connection adapter, and the pressure, the density and/or the temperature of the gas from the process chamber is/are measured with a sensor of the measuring system; B) the connection to the process chamber is closed gas-tight by operating a shutoff device of the connection adapter in the line system; C) a test unit for providing a gas with a preset pressure, a preset density and/or a preset temperature is connected to the measuring system via the access port and the line system of the connection adapter or becomes connected to the measuring system via the access port and the line system of the connection adapter; D) the operation of the measuring system is tested with the aid of the test unit, in particular by building up a test pressure built up with the aid of the test pressure; and/or E) the test unit is decoupled or separated from the access port, the connection to the process chamber is opened with the aid of the shutoff device, and the pressure, the density and/or the temperature of the gas from the process chamber is/are subsequently remeasured with the sensor of the measuring system.

It may be provided that, in the steps A) and E), the pressure, the density or the temperature of the gas from the process chamber is/are displayed and/or monitored with the measuring system. The fact that the pressure, the density and/or the temperature of the gas from the process chamber is/are measured with the sensor of the measuring system means that at least one of the aforementioned physical parameters is measured.

The connection adapter remains connected to the process chamber and the measuring system the whole time that the method is carried out. For this purpose, the connection adapter provides the line connections between the measuring system, the process chamber and the test unit. The test unit may also theoretically remain connected to the connection adapter during the method. However, this is not absolutely necessary.

The test unit can be separated from the measuring system after step D) but before step E) or in step E), for example, the access port being blocked in step E) for this purpose, in particular using a self-sealing coupling. An interfering interaction between the test unit and the measuring system is prevented hereby.

Moreover, it may be provided that a closure part of the shutoff device, in particular a sealing cone, can be pressed into a sealing seat of the shutoff device during the closing of the shutoff device in step B), a gas-permeable connection of the line system to the measuring system being closed in the sealing seat, and the line system being blocked gas-tight thereby. A reliable, gas-tight closing of the line system may be ensured hereby in a structurally simple manner.

It may also be provided that the closure part of the shutoff device, in particular the sealing cone, can be lifted from the sealing seat during the opening of the shutoff device in step E), the line system between the process chamber and the measuring system being opened.

It may furthermore be provided that a tool can be connected to the shutoff device for closing the shutoff device in step B), the shutoff device being operated with the tool, the tool being undetachably connected to the shutoff device during operation, using the shutoff device, as long as the shutoff device is closed or not opened all the way, and the shutoff device being opened, for example opened all the way, with the tool in step E), and the tool, for example, being detached from the shutoff device in a step F) following step E). This may achieve the fact that the user does not inadvertently leave the shutoff device closed after using the test unit when the equipment, including the process chamber, is placed back into operation. Since the tool is detachable only if the shutoff device is not closed, and the technician entrusted with testing the measuring system with the aid of the test unit packs up his tool and takes it with him during the normal course of his work will be forced to open the shutoff device again.

In summary, the invention and its embodiments are based on the surprising finding that the testing of the measuring system may be successfully carried out directly without any additional connections having to be established between the test unit and measuring system, due to a connection between the measuring system and an access port in a shared connection adapter, which is opened at least when the connection between the measuring system and process chamber is closed or blocked. In addition, a particularly high tightness of the shutoff device and the entire connection adapter may be achieved, due to the described design of the connection adapter. An operator error of the connection adapter may furthermore be reliably prevented through simple, suitable structural measures. Moreover, due to the design, no impairment of the atmosphere of the process chamber by the test gas of the connected test unit occurs, and as a result the possible period of use for the components in the process chamber is not reduced.

The connection adapter and/or the measuring apparatus, including the shutoff device, have a design, according to possible embodiments thereof, that make it possible to seal the connection to the process port with less than one rotation and thus carry out the testing of a connected pressure, density or temperature measuring system via the access port. The pressure, density or temperature measuring system is designed, for example with trip contacts, which trip and are tested via the access port for test tripping purposes during a test. For example, a test plug connector is mounted for this purpose on the pressure, density or temperature measuring system, and a reference pressure or a continuous pressure increase is applied to the access port.

The pressure, density or temperature measuring system may advantageously remain connected to the process port during the blocking.

After the test, the access port may be closed again, the shutoff device is opened, and the pressure, density or temperature measuring system is reconnected to the process pressure from the process chamber.

The tool situated on the shutoff device, for example the tool designed as a key, may be removed according to one possible embodiment only when the shutoff device is opened again, in particular opened all the way. This avoids forgetting to properly reconnect the pressure, density or temperature measuring system to the process chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

An exemplary embodiment of a connection adapter 500 and parts thereof in a mounted and non-mounted state as well as a measuring system 2 are illustrated in different views in FIGS. 1 through 7.

Connection adapter 500 comprises a base body 1, to which a measuring system 2 in the form of a pressure, density or temperature measuring system is connected.

Figure 1:
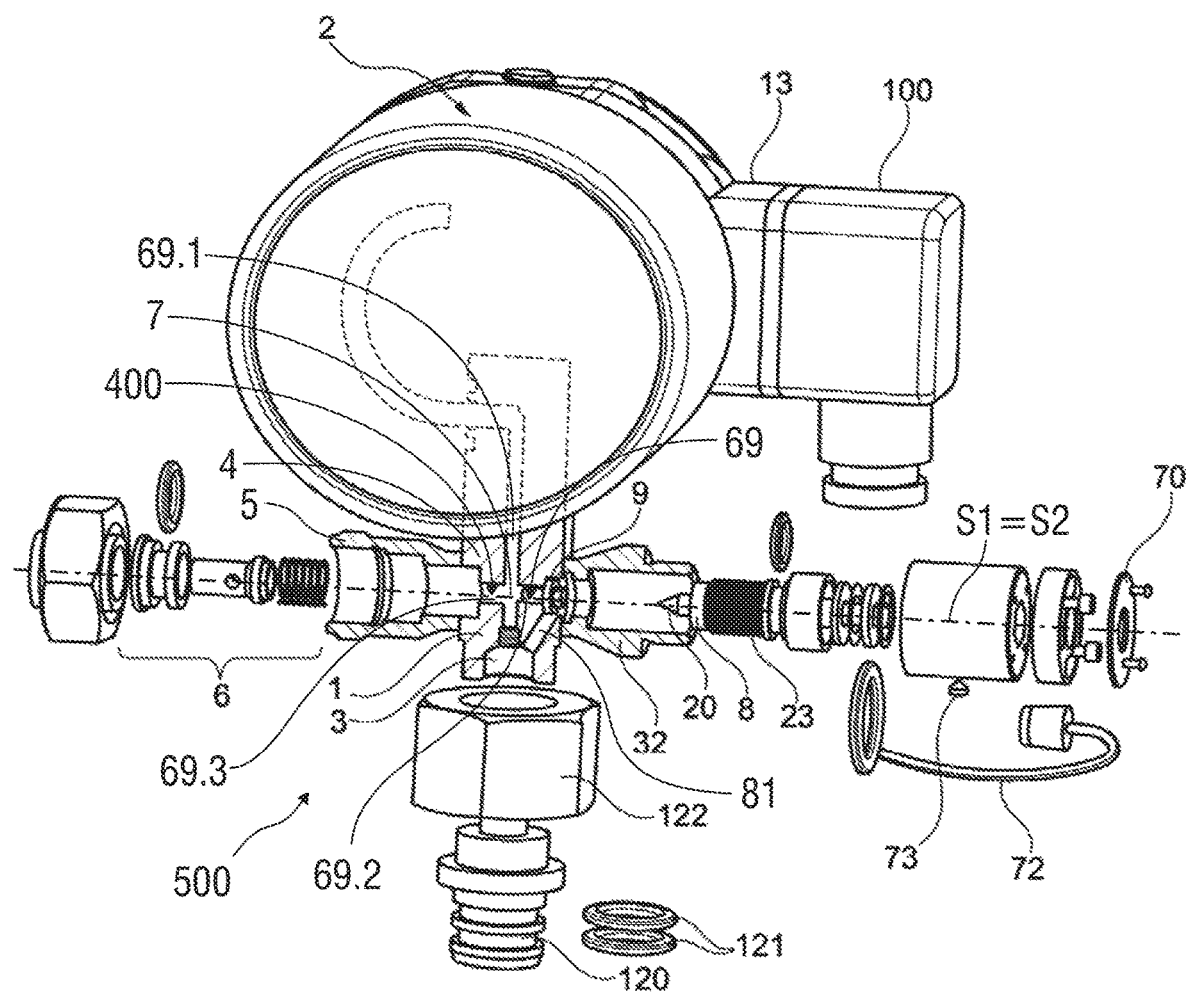
FIG. 1 shows a schematic view of an exploded representation of an exemplary embodiment of a connection adapter and a perspective view of a measured system, including a sectional representation of a base body.
Figure 2A:
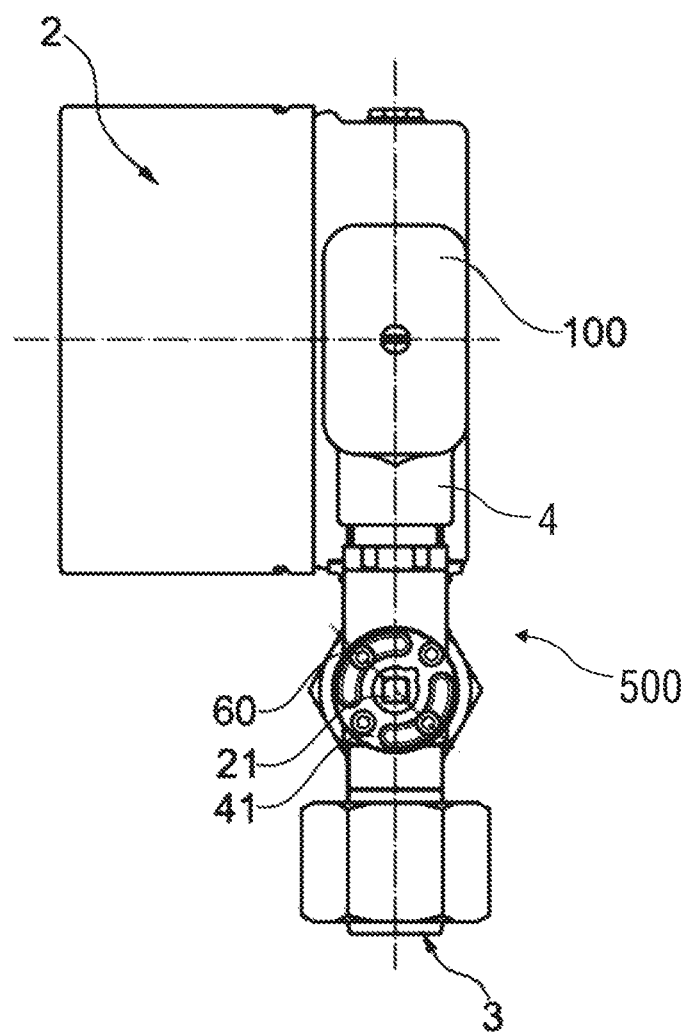
FIG. 2A shows a schematic side view of the connection adapter and the measuring system according to FIG. 1.
Figure 2B:
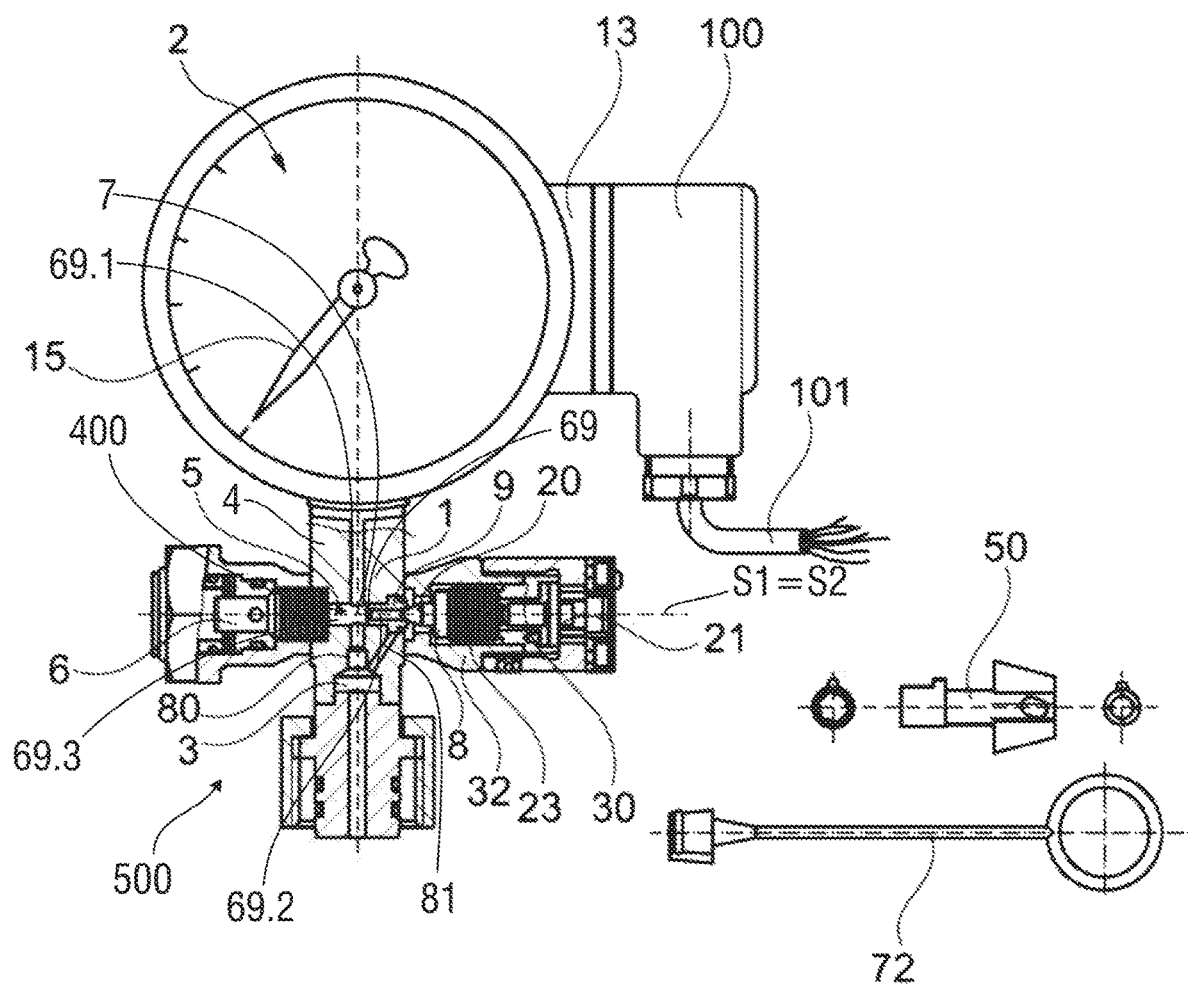
FIG. 2B shows a schematic top view of the connection adapter and the measuring system according to FIG. 1, including a sectional representation of the base body.
Figure 3:
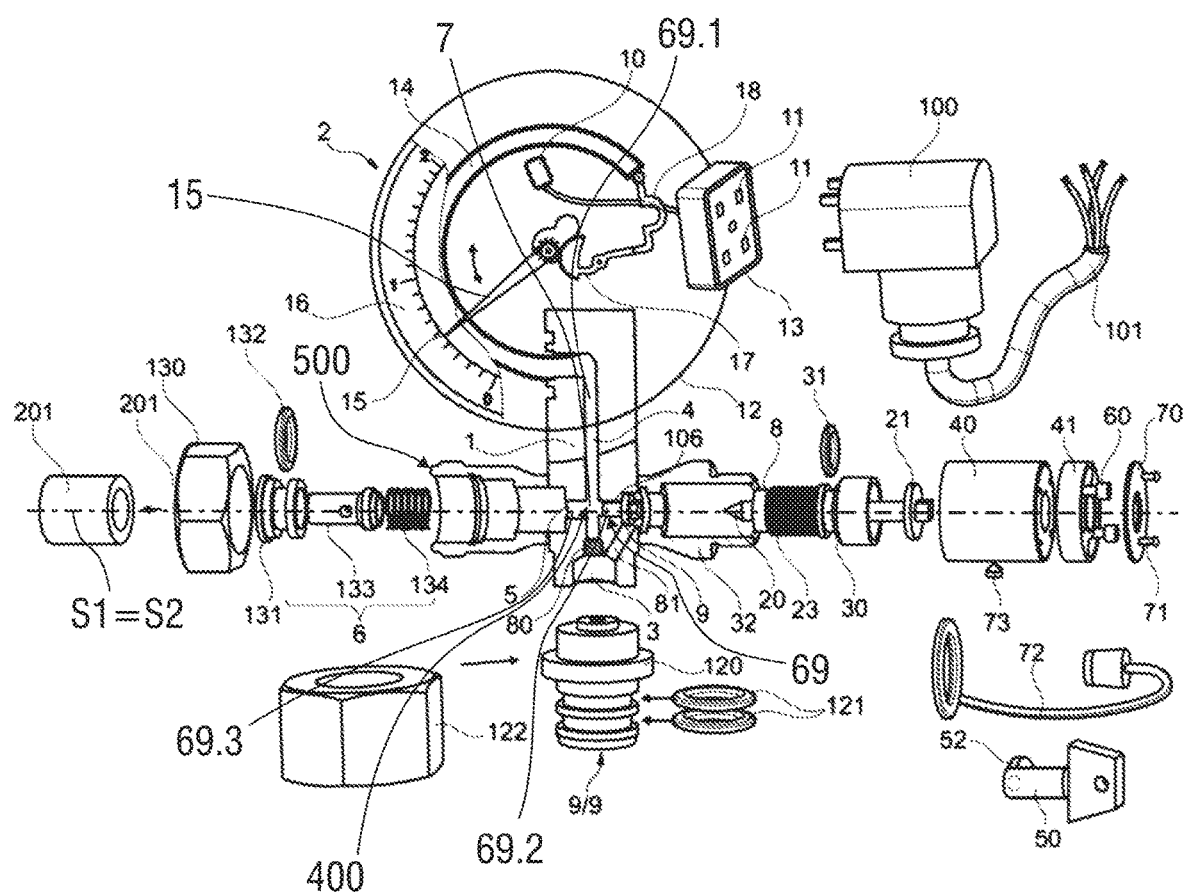
FIG. 3 shows a schematic view of an exploded representation of the connection adapter and the measuring system according to FIG. 1, including a sectional representation of a base body and a partial section of the measuring system.
Figure 4:
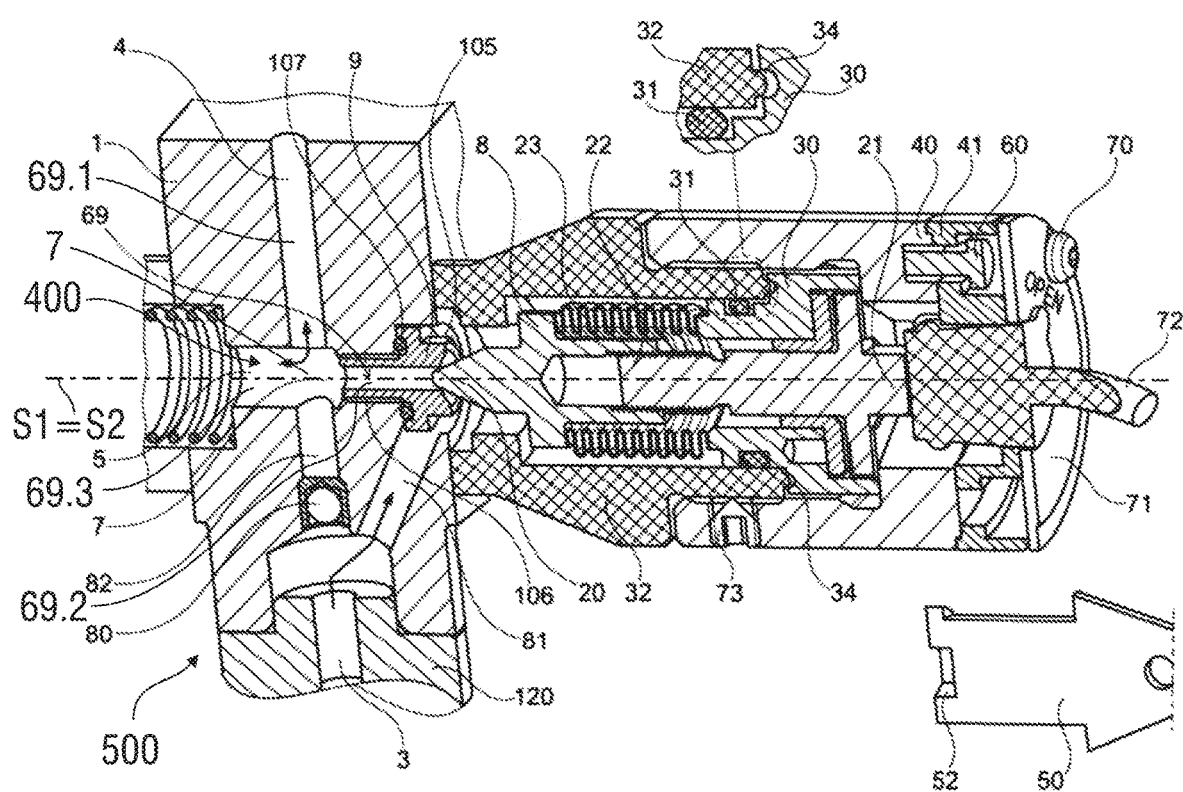
FIG. 4 shows a schematic view of a sectional representation of a detail of the connection adapter according to FIG. 3 in the area of a shutoff device connected to the base body.

According to the illustration in FIG. 3, measuring system 2 is designed by way of example as a density measuring system.

Figure 6:
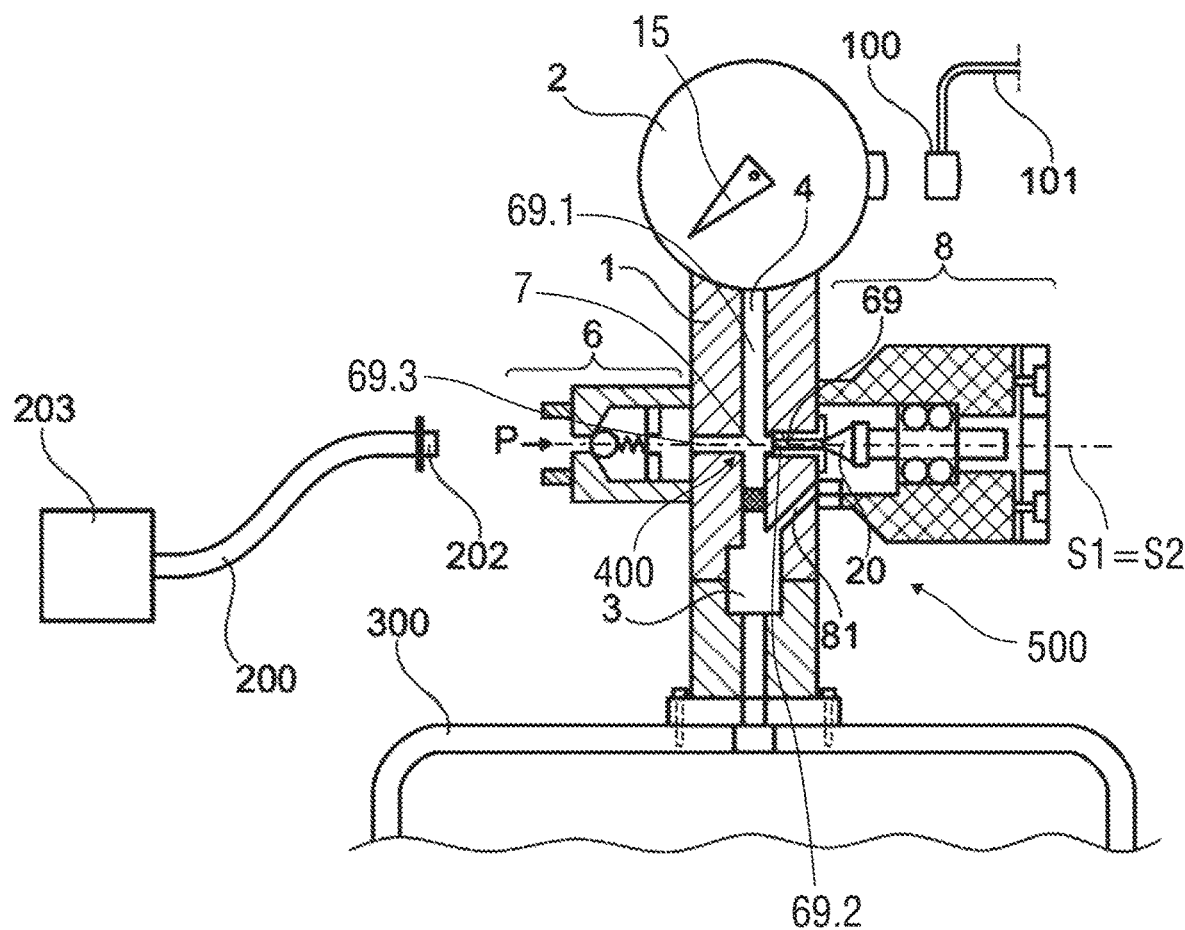
FIG. 6 shows a schematic view of a sectional representation of the connection adapter coupled to a process chamber and the measuring system according to FIG. 1 and a test unit.
Figure 7:
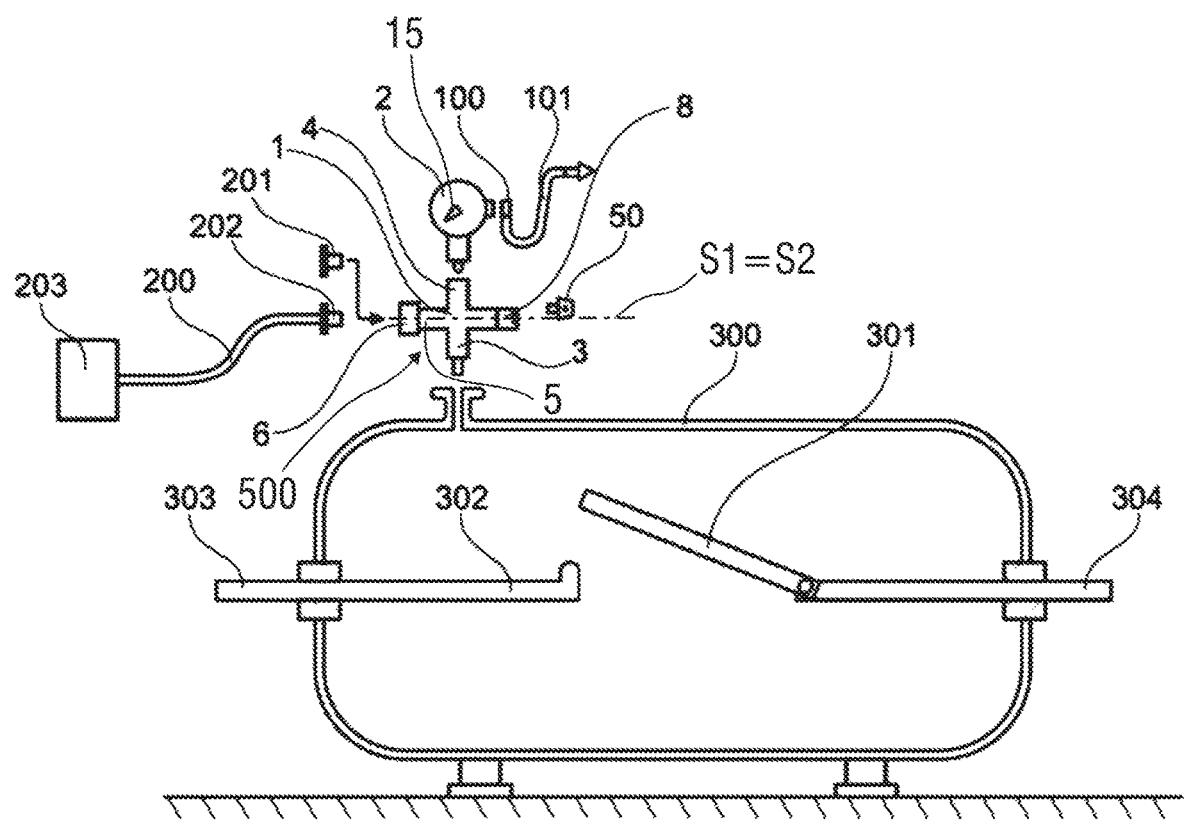
FIG. 7 shows a schematic view of an exploded representation of the connection adapter coupled to the process chamber and the measuring system and the test unit according to FIG. 6.

Connection adapter 500 has a process port 3 at one end, for example at a downward facing end of base body 1 in use, i.e. in the installed or mounted state of connection adapter 500, process port 3 being connected or connectable to a process chamber 300 according to the illustrations in FIGS. 6 and 7.

Process chamber 300 is a gas or liquid tank. For example, process chamber 300 is an insulation tank of an electrical switchgear, which is filled with $SF_6$ as the insulating gas. In such insulation tanks of electrical switchgear, an adherence to minimum values of the density of the $SF_6$ gas must be monitored, in particular. This is done with the aid of a measuring system 2 designed as a density monitor, which includes one or multiple trip contacts 10, as shown in greater detail in FIG. 3. These trip contacts 10 respond at different critical or settable density measured values or pressure or temperature measured values. Trip contacts 10 are brought out from a housing 12 of measuring system 2 via a plug connection 13 in the form of individual contacts 11, and their electrical signals are forwarded to a switching or monitoring control room via a plug connector 100 and a cable 101.

Measuring system 2 is connected to a measuring port 4 of connection adapter 500, as described above. Measuring system 2 may be a manometer, thermometer or the aforementioned density measuring unit.

Connection adapter 500 furthermore has an access port 5, which according to the illustrated embodiment includes a self-sealing coupling 6 and which is connectable, for example, to a test unit 203 via a hose 200, as illustrated in greater detail in FIGS. 6 and 7, or it may be provided with a sealing plug 201. Coupling 6 includes a spring-mounted bolt 133 having a diameter between 1 mm and 10 mm, for example between 6 mm and 8 mm, which carries a seal 132 according to FIG. 3 or onto which seal 132 may vulcanized. When mounting a mating coupling 202 of a test unit 203, bolt 133 is displaced and opens a cross-section for an inlet to the line system in connection adapter 500 and thus, for example, for applying a test pressure P or a test temperature or a test density to measuring system 2.

Process port 3 must first have been sealed and blocked for a test of this type. The three ports, i.e. process port 3, measuring port 4 and access port 5, of connection adapter 500 are connected to each other via multiple channel bores, which meet at an intersection 7, where they are connected to each other. Process port 3 may be blocked in a sealing manner with respect to measuring port 4 and access port 5 via a shutoff device 8 designed, for example, as a stop valve or comprising a stop valve, for the purpose of allowing test and calibration pressures of test unit 203 to act only directly upon measuring system 2.

For example, measuring port 4 of connection adapter 500 is designed as a single piece with base body 1 for connecting measuring system 2. This means, for example, that measuring system 2 designed as a density or pressure measuring system according to FIG. 3 is not coupled in a sealing manner, but instead a bourdon tube 14 of measuring system 2 is welded to measuring port 4 in a sealing manner for measuring pressure or density.

A sealing seat 9 of shutoff device 8 is disposed opposite access port 5, for example in such a way that the corresponding channel pores are aligned. For example, a second line part 69, in particular a multi-part second line part 69 connects an opening in sealing seat 9 of shutoff device 8 to intersection 7, and intersection 7 connects both measuring port 4 and access port 5 in a gas-permeable manner via line parts 69.1 and 69.3. This means that shutoff device 8 has an axis of symmetry S1 which runs through sealing seat 9, axis of symmetry S1 of shutoff device 8 running at the same height as or at least almost congruently with an axis of symmetry S2 of line part 69.3 to access port 5.

Further, axis of symmetry S1 of shutoff device 8 can run at least essentially at the same height as axis of symmetry S2 of line part 69.3 to access port 5, line part 69.3 of access port 5 and shutoff device 8, however, not being opposite each other but rather situated in a shared plane and, for example, running at an angle of 90° to each other. Any other angle is also possible.

Base body 1 is manufactured, for example, from steel, and sealing seat 9 of stop valve 8 or shutoff device 8 is manufactured from a softer metal, for example from brass. Sealing seat 9 is screwed into a channel bore 106 via a molded-on square or hexagon 105 as the key surface, an O ring 107 forming a seal in the direction of connection adapter 500, in the direction of channel bore 106. Alternatively sealing seat 9 may be glued in, forming a seal. A gas-permeable line 69.1, which is blockable with shutoff device 8, is disposed in the body of sealing seat 9.

Within base body 1 of connection adapter 500 is a line system 400, which comprises a first line part 81, which connects process port 3 to the space of shutoff device 8, 308, 318. Line system 400 furthermore comprises a second line part 69, which connects an opening in sealing seat 9 of shutoff device 8, 308, 318 to intersection 7 via a line 69.2 and also gas-permeably connects intersection 7 to measuring port 4 with the aid of a line 69.1 as well as to access port 5 with the aid of a line 69.3.

Connection adapter 500, including shutoff device 8, is used to test measuring system 2 and, in the present case, adjustable, electrical or electronic trip contacts 10 on measuring system 2, connected pressure-tight and designed as a pressure, density or temperature measuring system, which trip upon reaching a limit pressure, a limit density or a limit temperature.

For testing with the aid of a test unit 203, it is advantageous to leave measuring system 2 connected to process chamber 300 and to seal it off from process chamber 300 for the test with the aid of shutoff device 8.

This has the following reasons, among others: Insulation gas $SF_6$ is harmful to the environment and a removal and bleeding of the insulation gas is unnecessary with the aid of test port 5. Not only does this save assembly work but it also avoids contaminating the atmosphere with $SF_6$ gas. For this purpose, test unit 203 is connected to access port 5, and a plug connector 100 is replaced with a test plug connector. For this purpose, individual contacts 11 in shared plug connection 13, which are connected to trip contacts 10, are brought out of housing 12 of measuring system 2 as individual contacts 11 and are electrically contactable with a test plug connector.

Measuring system 2 is, for example, a monitor for density in the form of a temperature-compensated bourdon tube 14, to which a motion works 17 having a pointer 15 is connected, which outputs a density value on a dial 16 according to FIG. 3. The temperature compensation is implemented, for example, via a bimetal 18 as the connecting element.

Alternatively, measuring system 2 is an electronic measuring unit, which ascertains pressure, density and/or temperature, alternatively also a gas moisture, via one or multiple sensors. Thin-film or piezoelectric sensors may also be used as pressure sensors, which, upon calculating measured values of a temperature, output the density either electronically or electrically using a so-called "highway-addressable remote transducer" (HART for short) or 4 mA to 20 mA standard.

To block process port 3, shutoff device 8 includes a linearly movable sealing cone 20, which is axially movable in a sealing manner against sealing seat 9 over a threaded section 22 via a square-head screw head 21 with the aid of a tool 50 designed as a key for operating shutoff device 8. For this purpose, square-head screw head 21 has a square which precisely fits into tool 50. Alternatively, other shapes are conceivable for the head of the screw, for example Torx or hexagon or any other closable shape.

Sealing cone 20 of shutoff device 8, which is movable via the screw, has an acute angle of 30°, an acute angle between 25° and 75°, for example between 40° and 60°, also being sufficient. A bore of sealing seat 9 has a diameter from 1 mm to 5 mm, for example between 1 mm and 3 mm.

Sealing cone 20 of shutoff device 8, which is movable via the screw, is sealed to a valve body 32 of shutoff device 8 having a bellows 23 or another sealing means, which is formed from a high-grade steel sheet and which is circumferentially welded to sealing cone 20 on one side and to a sealing element 30 on the other side.

Sealing element 30 is connected in a sealing manner to valve body 32 of shutoff device 8 via an O ring 31 and additionally metallically via a sealing groove 34. For this purpose, sealing element 30 is pressed onto valve body 32 with a housing part 40, in that housing part 40 is rotated with respect to valve body 32 until the sealing effect of sealing groove 34 sets in. Housing part 40 is then secured with adhesive and a locking screw 73.

Figure 5A:
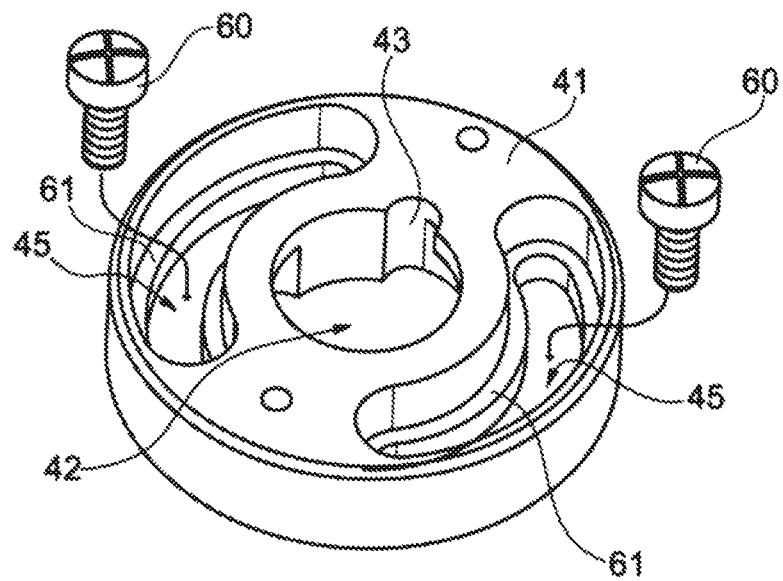
FIG. 5A schematically shows a first perspective view of a limiting disk of the connection adapter according to FIG. 1.
Figure 5B:
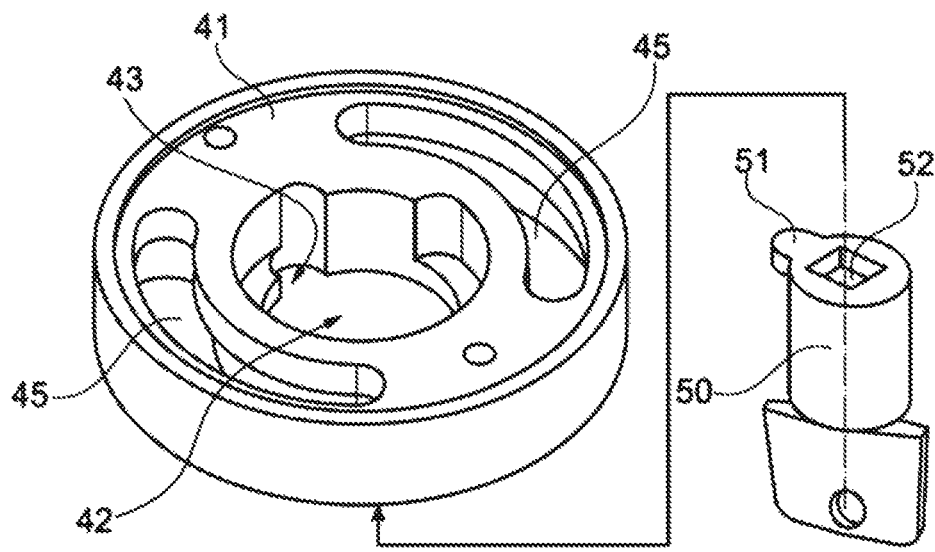
FIG. 5B schematically shows a second perspective view of the limiting disk according to FIG. 5A, including a tool for operating a shutoff device of the connection adapter according to FIG. 1.

According to FIGS. 5A and 5B, shutoff device 8 is provided with housing part 40 and a limiting disk 41, which facilitates the introduction of tool 50 designed as a key through a central opening 42 in a closed position of shutoff device 8. The key has a coding cam 51 as a securing device, which fits into a recess 43 of limiting disk 41 and is insertable thereinto. Alternatively, a circumferential wall as a securing device prevents the key from being pulled out upon rotation. When the key is inserted, the recesses of the key engage with square-head screw head 21 of the screw, which may move sealing cone 20 or shutoff device 8 into a closed sealing position or into an opened position upon rotation.

To enable the key to be inserted into shutoff device 8 or into housing part 40 only in the closed position, limiting disk 41, including a recess 43 for coding cam 51, is shaped or designed to be rotatable or alignable against housing 40, in particular during initial manufacture. After the alignment, limiting disk 41 is locked with two screws 60 and furthermore provided with a labeled cover disk 70, which is fastened on limiting disk 41 with two screws 71.

The rotatable design of alignable limiting disk 41 is designed to be coaxial to the screw having square-head screw head 21, limiting disk 41 being provided with bow-shaped, elongated grooves 45 for this purpose, which have a contact surface 61, via which limiting disk 41 may be fixed to housing part 40 with the aid of screws 60.

Shutoff device 8 is configured with the aid of the thread pitch of the screw having square-head screw head 21 in such a way that process port 3 of connection adapter 500 may be closed in a sealing manner with respect to measuring port 4 and access port 5 of connection adapter 500 and sealed gas-tight, with less than one full rotation, for example with a three-quarter rotation.

It is furthermore provided that an access to square-head screw head 21 may be closed against a penetration of dirt with the aid of a rubber plug 72, which is captively mounted on connection adapter 500 with the aid of a molded-on ring of rubber topper 72 on shutoff device 8.

For the compact design of connection adapter 500, it is provided in the present exemplary embodiment that a central channel bore 82 of process port 3 is closed with a plug 80 in the form of a cap having a sphere, which is pressed into the cap to form the seal. The process pressure is guided to shutoff device 8 and over sealing seat 9 via a first line part 81, designed as an angled bore, as part of a line system 400 or opens between sealing seat 9 and sealing cone 20 in the open state of shutoff device 8.

Process port 3 includes, in particular, a welded-on process adapter 120, which is provided with two O rings 121 and a cap nut 122. This process port 3 is a good option for fixed, tight and secure installation on a process chamber 300. Similarly, a cap nut 130 is provided on self-sealing coupling 6. Self-sealing coupling 6 also includes a coupling ring 131, which, according to FIG. 7, has a seal 132 for sealing against a mating coupling 202. Coupling ring 131 is supported in a spring-mounted manner in base body 1 of the valve element with bolt 133 having a spring 134. Spring 134 presses bold 133 into a closed position of self-sealing coupling 6. When the connection of test unit 203 is coupled to self-sealing coupling 6, bolt 133 is pressed into base body 1 against the elastic force of spring 134, thereby lifting it from a valve seat of self-sealing coupling 6 and opening self-sealing coupling 6 for a gas flow into or out of test unit 203.

A sectional representation of connection adapter 500 coupled with process chamber 300 and of measuring system 2 is illustrated in FIG. 6. FIG. 7 shows an exploded representation of connection adapter 500 coupled with process chamber 300, measuring system 2 and test unit 203. Process chamber 300 is shown in a cross sectional representation.

Shutoff device 8 is provided on the right side of base body 1 of connection adapter 500, with which downward facing process port 3 may be blocked off from the rest of the lines. Process chamber 300 is connectable to process port 3 via a flange.

Measuring port 4, to which measuring system 2 is connectable and is connected in FIG. 6, is provided on an upper side of base body 1 in FIG. 7, measuring signals of the measuring system being able to be transmitted via plug connector 100 and a cable 101.

Self-sealing coupling 6, to which, for example, a test unit 203 is connectable, is provided on the left side of base body 1. A hose 200 is provided on test unit 203, which is connectable to self-sealing coupling 6 via a mating coupling 202. When hose 200 is not fastened to self-sealing coupling 6 with mating coupling 202, self-sealing coupling 6 may become or be closed with a plug 201 for additional sealing purposes and to avoid contaminating self-sealing coupling 6.

A medium- or high-voltage circuit-breaker 301, which may be opened or closed against a mating contact 302, is situated in process chamber 300. Both may be electrically contacted via terminals 303, 304 or connected to a medium- or high-voltage electrical system. Process chamber 300 may be set up as a gas tank. An insulating gas is present in process chamber 300 to avoid voltage sparkovers and arcs during the switching operations. For example, $SF_6$ gas is used as the insulating gas.

Figure 8:
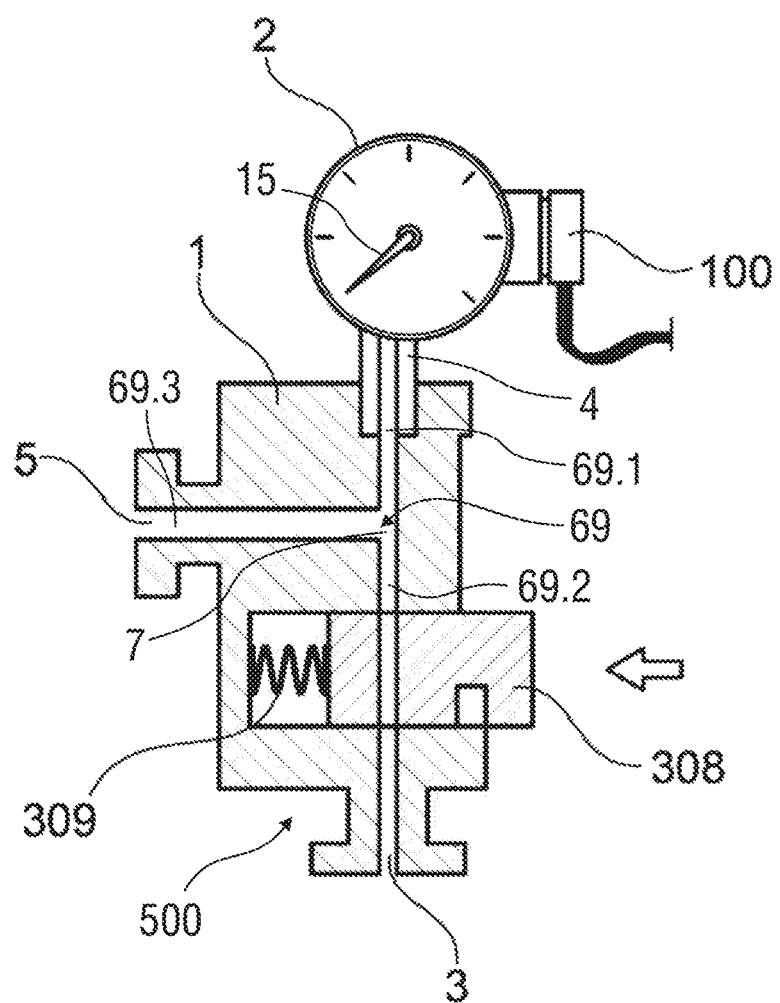
FIG. 8 shows a schematic view of an exemplary embodiment of a connection adapter and a top view of a measuring system coupled to the connection adapter.

FIG. 8 shows a sectional representation of a possible second exemplary embodiment of a connection adapter 500 and a top view of a measuring system 2 coupled with connection adapter 500. Connection adapter 500 comprises a base body 1, on which measuring system 2 is connected to a measuring port 4. In base body 1, channels in the form of a T piece are provided as line system 400, which connect measuring port 4, connected to measuring system 2, to a process port 3 and to a test port 5. A plug connector 100 is connected to measuring system 2, via which data on measured values of measuring system 2 may be read out electronically. Measuring system 2 is suitable for measuring a pressure, a temperature and/or a density, which reach(es) measuring system 2 via the measuring port.

To interrupt a part of the channel leading to process port 3, a linearly displaceable slide valve is situated in base body 1 as a shutoff device 308. A channel piece is provided in the slide valve, with which the part of the channel between a T intersection and process port 3 is continuously connectable when the slide valve is in an illustrated initial position. The slide valve is sealed against base body 1 in such a way that no gas is able to escape, regardless of its position. For this purpose, it may be provided that the slide valve is unable to be displaced beyond the illustrated position.

Shutoff device 308 designed as the slide valve is supported in base body 1 by a spring element 309. Spring element 309 pushes the slide valve into the illustrated initial position, in which process port 3 is connected to test port 5 and measuring system 2. In the event of a maintenance of measuring system 2, the slide valve may be pressed into base body 1 against the force of spring element 309, to the left in the exemplary embodiment illustrated, as indicated by the arrow. The slide valve then closes the connection to process port 3, while the channels between measuring system 2 and access port 5, which form a test line for this purpose, remain open. A test unit may be connected to access port 5, with which a gas having at least one defined pressure, at least one defined temperature and/or at least one defined density may be provided through the line system and used to calibrate measuring system 2. For this purpose, access port 5 includes a self-sealing coupling, to which the test unit is connectable.

To operate shutoff device 308 designed as a slide valve, a tool is needed, and with which the slide valve may be operated. For example, it is provided that the tool is detachable from the slide value only in the illustrated initial position, so that an operator of the slide valve may be prevented from removing the tool when the slide valve is not in the open initial position.

Figure 9:
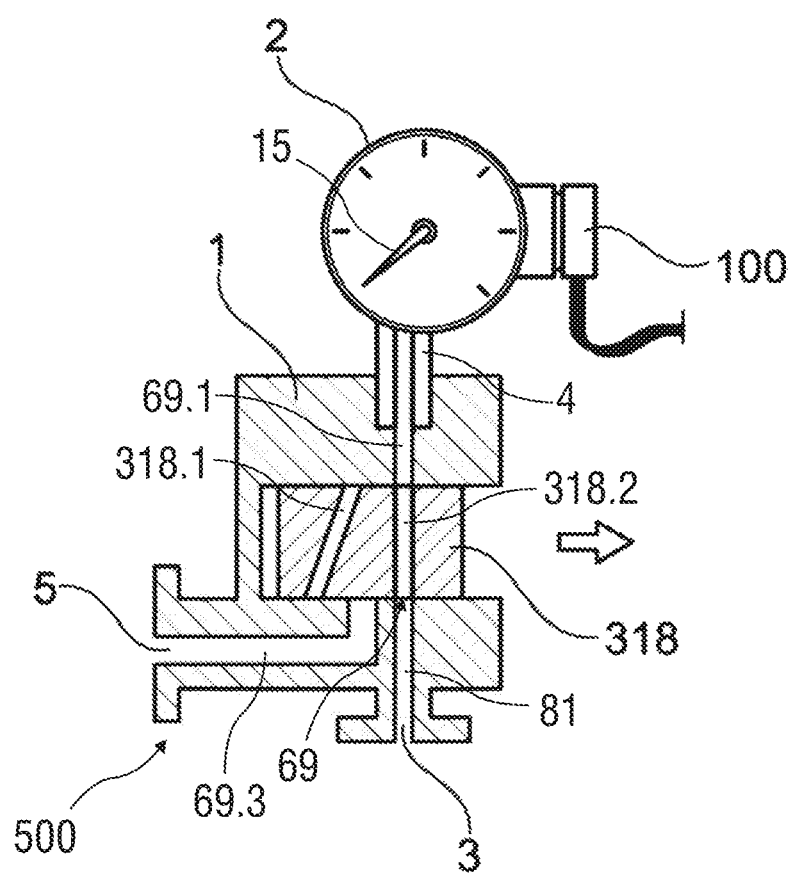
FIG. 9 shows a schematic view of a sectional representation of an exemplary embodiment of a connection adapter and a top view of a measuring system coupled to the connection adapter.

FIG. 9 shows a sectional representation of a possible third exemplary embodiment of a connection adapter 500 and a top view of a measuring system 2 coupled with connection adapter 500, which is connected to a measuring port 4 of a base body 1 of connection adapter 500. In base body 1, channels are provided as line system 400, which, as first line part 81 and second line part 69, connect measuring port 4, to which measuring system 2 is connected, to a process port 3 or to an access port 5. A plug connector 100 is connected to measuring system 2, via which data on measured values of measuring system 2 may be read out electronically. Measuring system 2 is suitable for measuring a pressure, a temperature and/or a density of a gas, which reach(es) measuring system 2 via measuring port 4.

A linearly displaceable slide valve is disposed as a shutoff device 318 in base body 1 to connect measuring system 2 to process port 3. Two channels 318.1, 318.2, a diagonal channel 318.1 and a direct, perpendicular channel 318.2, are provided in the slide valve. In a first position of the slide valve, which is illustrated in FIG. 9, measuring system 2 is continuously connected to process port 3 via perpendicular channel 318.2 and the corresponding channels in base body 1. The connection between measuring system 2 and access port 5 is closed. In a second position of the slide valve, measuring system 2 is continuously connected to access port 5 via diagonal channel 318.1 and the corresponding channels in base body 1. The connection between measuring system 2 and process port 3 is then closed. For this purpose, the slide valve must be removed from base body 1, i.e. pushed to the right in the illustrated embodiment, as indicated by the arrow. The slide valve is sealed against base body 1 in such a way that no gas is able to escape, regardless of its position. For this purpose, it may be provided that the slide valve is unable to be displaced beyond the illustrated first position.

In the event of a maintenance of measuring system 2, shutoff device 318 designed as a slide valve may be pulled out of base body 1, to the right in the exemplary embodiment illustrated, as indicated by the arrow. The slide valve then closes the connection to process port 3 and opens a connection between measuring system 2 and access port 5 with diagonal channel 318.1. A test unit may be connected to access port 5, with which a gas having at least one defined pressure, at least one defined temperature and/or at least one defined density may be provided via line 69.3 and used to calibrate measuring system 2. For this purpose, access port 5 includes a self-sealing coupling, to which the test unit is connectable.

To operate the slide valve, a tool is needed and with which slide valve 318 may be operated. For example, it is provided that the tool is detachable from the slide valve only in the illustrated first position, so that an operator of the slide valve may be prevented from removing the tool when the slide valve is not in the second initial position or when slide valve 318 is not in the first position.

For example, it is provided that a restoring element is provided, which transfers shutoff device 318 designed as a slide valve into the illustrated first position. At least one spring element may be provided for this purpose. For example, the restoring element presses or pulls the slide valve into the illustrated first position when the tool is detached from the slide valve.

Figure 10:
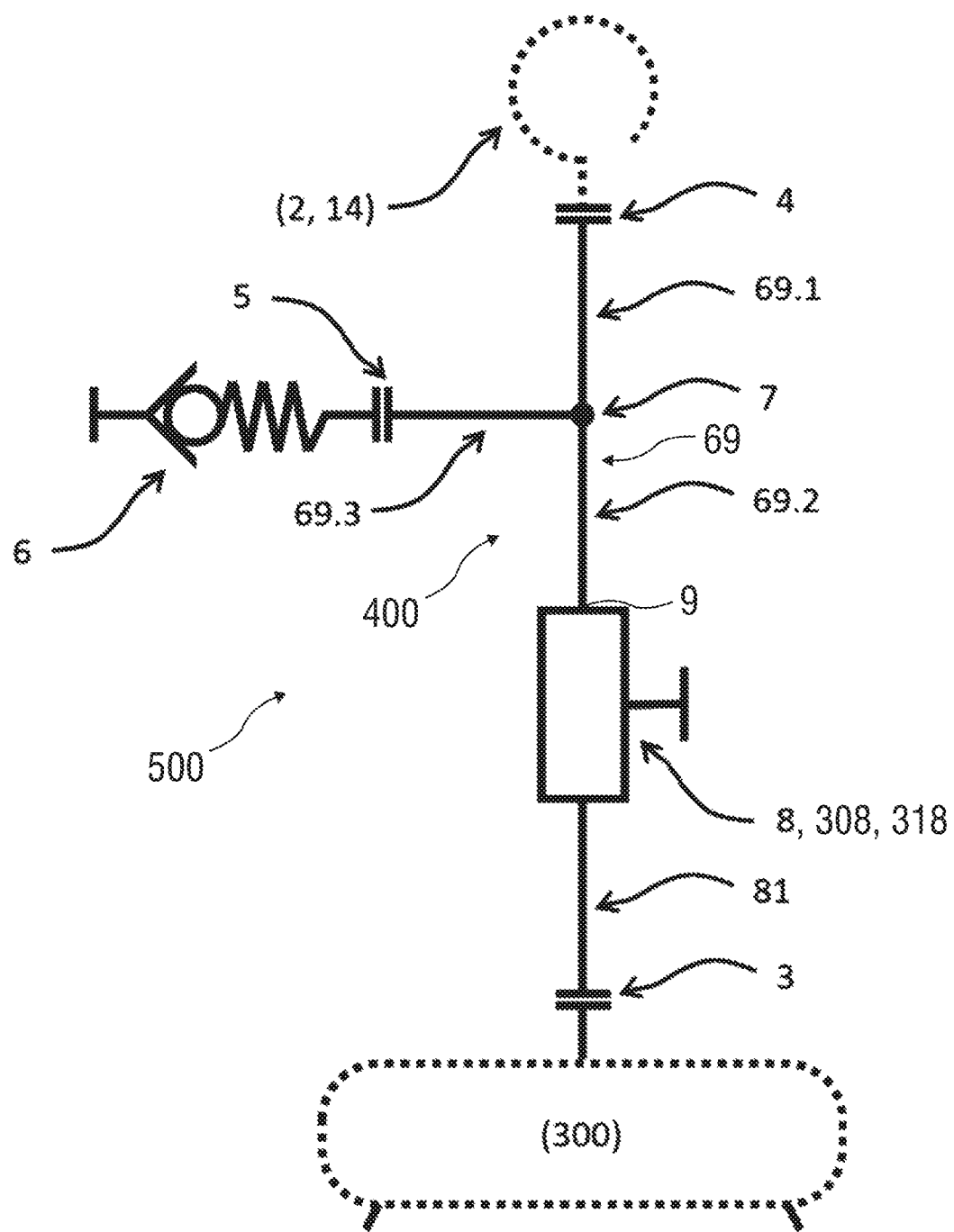
FIG. 10 shows a schematic view of a diagram of a line system of an exemplary embodiment of a connection adapter, including a coupled measuring system, a coupled process chamber and a coupled self-sealing coupler.

FIG. 10 shows the diagram of a line system 400 of one possible exemplary embodiment of a connection adapter 500, including a coupled measuring system 2, a coupled process chamber 300 and a coupled self-sealing coupler 6.

Line system 400 is formed within base body 1 of connection adapter 500 and comprises a first line part 81, which connects process port 3 to the space of shutoff device 8, 308, 318. Line system 400 furthermore comprises a second line part 69, which connects an opening in sealing seat 9 of shutoff device 8, 308, 318 to intersection 7 with the aid of line 69.2 and also gas-permeably connects intersection 7 to measuring port 4 with the aid of line 69.1 as well as to access port 5 with the aid of line 69.3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A connection adapter to connect a process chamber to a measuring system, including a pressure, density or temperature measuring system, the connection adapter comprising:

a process port adapted to be connected to the process chamber;

a measuring port adapted to be connected to the measuring system;

an access port that has a self-sealing coupling; and a line system that has at least one line and at least one closable shutoff device, the line system connecting the process port to the measuring port and the access port;

wherein the connection between the process port and the measuring port is blockable gas-tight via the shutoff device, wherein the access port is adapted to be connected to the measuring port via the line system, and wherein the shutoff device has a closure part and a sealing seat, and wherein the closure part is a sealing cone that is movable against the sealing seat and that is movable axially in a sealing manner against the sealing seat over a threaded section via a screw or a square-head screw.

2. The connection adapter according to claim 1, further comprising a one-piece base body, in which the line system and the access port are formed, wherein the base body is made from a steel, high-grade steel, aluminum or a metallic alloy.

3. The connection adapter according to claim 2, wherein the measuring system is connected or welded directly to the one-piece base body at the measuring port.

4. The connection adapter according to claim 1, wherein the shutoff device has an axis of symmetry that runs through the sealing seat and the closure part, and wherein the axis of symmetry runs in parallel to a line to the access port.

5. The connection adapter according to claim 1, wherein an axis of symmetry of the shutoff device runs at a same height as or congruently or in a plane with an axis of symmetry of a line to the access port.

6. The connection adapter according to claim 1, wherein the closure part of the shutoff device is connected, sealed to the outside, to a valve body of the shutoff device via a bellows or a metal bellows, and wherein the valve body is rigidly connected to the sealing seat.

7. The connection adapter according to claim 6, wherein the closure part is connected to a sealing element via the bellows, the sealing element being sealed to the valve body with an O-ring and/or the sealing element being metallically sealed against the valve body via a sealing groove.

8. The connection adapter according to claim 1, wherein the line system comprises multiple line parts, a space between the sealing seat and the closure part of the shutoff device and an intersection, wherein a first line part connects the process port to a space of the shutoff device, and wherein a second line part or a multi-part second line part connects an opening in the sealing seat of the shutoff device to the intersection and gas-permeably connecting the intersection to the measuring port as well as to the access port.

9. The connection adapter according to claim 1, wherein a first line part of the line system, which connects the process port to the shutoff device, opens into the shutoff device between the sealing seat and the closure part when the shutoff device is open, wherein a second line part of the line system, which connects the shutoff device to the measuring port, is connected to an opening in the sealing seat of the shutoff device for connection to the shutoff device, and wherein the first line part of the line system opening into the shutoff device at an angle between 85° and 5° to an axis of symmetry of the sealing seat or the closure part.

10. The connection adapter according to claim 1, wherein the shutoff device is reversibly blockable gas-tight from a completely open state with less than one full rotation or with a three-quarter rotation.

11. The connection adapter according to claim 1, wherein the line system comprises multiple channel bores, which are formed in the connection adapter, or wherein the line system and the access port each comprise at least one channel bore, which is/are formed in the connection adapter, and wherein a dead leg between the process port and an intersection to the access port is provided, which is closed with a closure or a plug.

12. A measuring apparatus, comprising a connection adapter according to claim 1.

13. The measuring apparatus according to claim 12, wherein the sealing cone of the shutoff device has an acute angle between 40° and 60° or 25° and 75°, and wherein the sealing seat of the shutoff device has a diameter between 1 mm and 3 mm or 1 mm and 5 mm.

14. The measuring apparatus according to claim 12, wherein adjustable electrical or electronic trip contacts are provided on the measuring system, which trip upon reaching a limiting value or upon reaching a limit pressure, a limit density or a limit temperature, wherein separate individual contacts, which are individually electrically accessible from outside the measuring system, are connected, the individual contacts being part of a shared plug connection, and wherein electrical connections between the trip contacts and the individual contacts are brought out from a housing of the measuring system towards an area of the plug connection.

15. The measuring apparatus according to claim 12, wherein the measuring system is a bourdon tube system, which is connected to a motion works, or wherein the measuring system is an electronic measuring system, which includes a diaphragm and/or piezoelectric measuring cell, or wherein the measuring system is a pressure, density or temperature measuring system.

16. The measuring apparatus according to claim 12, wherein the access port is a test port and is connected or connectable to a test unit.

17. A connection adapter to connect a process chamber to a measuring system, including a pressure, density or temperature measuring system, the connection adapter comprising:
a process port adapted to be connected to the process chamber;
a measuring port adapted to be connected to the measuring system;
an access port that has a self-sealing coupling; and
a line system that has at least one line and at least one closable shutoff device, the line system connecting the process port to the measuring port and the access port;
wherein the connection between the process port and the measuring port is blockable gas-tight via the shutoff device,
wherein the access port is adapted to be connected to the measuring port via the line system, and
wherein the shutoff device is operable with the aid of a tool, and wherein a securing device prevents the tool from being detached from the shutoff device when the shutoff device is closed or when the shutoff device is not open all the way.

18. The connection adapter according to claim 17, wherein the securing device comprises a housing part and a limiting disk that is adjustable or rotatably supported with respect to the housing part and which is guided via elongated grooves, wherein the tool is a key, wherein the limiting disk enables the tool, including a coding cam of the tool, to be introduced through a central opening in a completely open position of the shutoff device, the coding cam being introducible into a recess in the limiting disk or a circumferential wall preventing a removal of the tool upon rotation.

19. A connection adapter to connect a process chamber to a measuring system, including a pressure, density or temperature measuring system, the connection adapter comprising:
a process port adapted to be connected to the process chamber;
a measuring port adapted to be connected to the measuring system;
an access port that has a self-sealing coupling; and a line system that has at least one line and at least one closable shutoff device, the line system connecting the process port to the measuring port and the access port;

wherein the connection between the process port and the measuring port is blockable gas-tight via the shutoff device, wherein the access port is adapted to be connected to the measuring port via the line system, and wherein the shutoff device is part of a two-way valve system, which, in a first position, connects the measuring port to the access port and closes the line system, and, in a second position, connects the measuring port to the process port via the line system and closes the access port.

* * * * *